(12) United States Patent
Liu et al.

(10) Patent No.: US 9,257,719 B1
(45) Date of Patent: Feb. 9, 2016

(54) ELECTROLYTE ADDITIVES FOR LITHIUM-ION BATTERIES

(75) Inventors: Ping Liu, Irvine, CA (US); Elena Sherman, Culver City, CA (US); John Wang, Glendora, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1173 days.

(21) Appl. No.: 12/502,234

(22) Filed: Jul. 14, 2009

(51) Int. Cl.
| | |
|---|---|
| *H01M 10/0567* | (2010.01) |
| *H01M 4/583* | (2010.01) |
| *H01M 4/131* | (2010.01) |
| *H01M 4/133* | (2010.01) |
| *H01M 4/485* | (2010.01) |
| *H01M 10/0525* | (2010.01) |

(52) U.S. Cl.
CPC .......... *H01M 10/0567* (2013.01); *H01M 4/131* (2013.01); *H01M 4/133* (2013.01); *H01M 4/485* (2013.01); *H01M 4/583* (2013.01); *H01M 10/0525* (2013.01); *Y02E 60/122* (2013.01)

(58) Field of Classification Search
CPC .......... H01M 10/0567; H01M 10/052; H01M 10/0568; H01M 10/0569; H01M 4/131; H01M 4/133; H01M 4/13; H01M 4/485; H01M 4/583; H01M 2300/0025; H01M 2004/027; H01M 2004/028; H01M 10/0525; Y02E 60/122

USPC ........... 429/307, 339, 200, 231.8, 231.95, 429/231.1, 306, 303; 252/62.2
See application file for complete search history.

(56) References Cited

U.S. PATENT DOCUMENTS

| | | | |
|---|---|---|---|
| 4,617,244 A | 10/1986 | Greene | |
| 5,759,714 A | 6/1998 | Matsufuji et al. | |
| 6,569,573 B1 | 5/2003 | Mikhaylik et al. | |
| 7,078,131 B2 * | 7/2006 | Noh | 429/303 |
| 2005/0019670 A1 | 1/2005 | Amine et al. | |
| 2007/0015048 A1 * | 1/2007 | Lee et al. | 429/307 |
| 2009/0061303 A1 * | 3/2009 | Inagaki et al. | 429/163 |

FOREIGN PATENT DOCUMENTS

JP  8-236155  * 9/1996

* cited by examiner

*Primary Examiner* — Laura Weiner
(74) *Attorney, Agent, or Firm* — O'Connor & Company (57) ABSTRACT

This invention employs a diamine electrolyte additive that enhances performance of lithium-ion batteries both at high and low temperatures, thereby minimizing the conventional performance gap across a wide temperature range, such as −30° C. to 60° C. At low temperatures, diamine additives can enhances cycling kinetics. At high temperatures, diamine additives can minimize capacity fading. In some variations, a lithium-ion battery electrolyte composition comprises a non-aqueous solvent, a lithium salt soluble in the non-aqueous solvent, and a diamine additive having the formula $H_2N-R-NH_2$, wherein R is an organic group such as $(-CH_2-)_n$, n=2-12.

16 Claims, 5 Drawing Sheets

ELECTROLYTE ADDITIVES FOR LITHIUM-ION BATTERIES

FIELD OF THE INVENTION

The present invention generally relates to improved lithium-ion batteries.

BACKGROUND OF THE INVENTION

Batteries based on lithium (Li), such as lithium-ion batteries, are attractive due to their high energy density compared to other commercial batteries. Li-ion batteries are used commercially in computers, cell phones, and related devices. Li-ion batteries have potential for use in electric vehicle/hybrid-electric vehicle (EV/HEV) applications. The most-suitable battery technology, which offers both a sufficient range and enough power to provide the acceleration required by today's drivers, is the lithium-ion battery system (Grove and Burgleman, *The McKinsey Quarterly*, December 2008).

In recent years, commercial efforts have attempted to improve lithium-ion batteries to meet the requirements demanded for target applications. Particularly for EV/HEV applications, high charge and discharge rates across a large temperature range (e.g., −30° C. to 60° C.) and long cycle life are critical requirements. Presently, these requirements have not been met. To date, a major technological bottleneck limiting the operation of Li-ion batteries over a wide temperature range is the electrolyte.

In a typical Li-ion battery, the Li$^+$ cation moves from the anode to the cathode (discharging) or cathode to anode (charging). The electrolyte is normally a lithium salt in a non-aqueous solvent. Electrolyte additives are known in the art which possess specific properties to enhance battery function. Electrolyte additives are generally beneficial at either low or high temperature, but not across a wide range of temperatures. Typically, such additives exhibit specific functions to enhance battery discharge capacity and cycling stability. Some additives work very well for low temperatures but not at high temperatures, while other additives perform well at high temperatures but not at low temperatures.

In light of these and other shortcomings in the art, improved electrolyte additives are needed for Li-ion batteries. Improved electrolyte additives preferably minimize the battery performance gap between low and high temperatures, maintaining good function and cycle stability throughout a range of practical operation temperatures. What is particularly desired are electrolyte additives that are selected or designed to be effective at any practical temperature, by employing at least two different temperature-dependent chemical mechanisms suitable to confer benefits to battery performance.

SUMMARY OF THE INVENTION

The present invention addresses the aforementioned needs in the art, as will now be summarized and further described in detail below.

In some variations, this invention provides a lithium-ion battery electrolyte composition comprising a non-aqueous solvent, a lithium salt soluble in the non-aqueous solvent, and one or more diamine additives having the formula H$_2$N—R—NH$_2$, wherein R is an organic group, and wherein the diamine additive is soluble in the electrolyte composition.

The diamine additive is present in an amount selected from about 0.001 wt % to about 10 wt %, for example. In some embodiments, the diamine additive is present in an amount selected from about 0.01 wt % to about 1 wt %.

In some embodiments, R is a saturated aliphatic chain. In other embodiments, R is an unsaturated aliphatic chain. The R group can be linear or non-linear. In some embodiments, R includes an aromatic group and/or a non-aromatic cyclic group. The R group can include at least one linear, cyclic, or branched hydrocarbon side group at a carbon atom within the R group. Alternatively, or additionally, R can include at least one aromatic side group at a carbon atom within the R group.

The R group can include at least one additional amine group within the R group in place of a hydrogen atom. In some embodiments, the additional amine group is end-functionalized. In other embodiments, the additional amine group is not end-functionalized.

In certain embodiments, R is —(CH$_2$)$_n$— and wherein n is selected from 1 to 20, such as 2-12, preferably 2-6. The diamine additive is ethylene diamine, in some embodiments.

Some variations of the present invention also provide a lithium-ion battery comprising:
(a) an anode capable of reversibly absorbing and releasing lithium ions;
(b) a cathode capable of reversibly absorbing and releasing lithium ions; and
(c) an electrolyte comprising a non-aqueous solvent, a lithium salt soluble in the non-aqueous solvent, and at least one diamine additive having the formula H$_2$N—R—NH$_2$, wherein R is an organic group, and wherein the diamine additive is soluble in the electrolyte.

In certain embodiments of the battery of the invention, R is —(CH$_2$)$_n$— and n is selected from 1 to 20, such as from 2 to 12. The diamine additive is (or includes) ethylene diamine, in preferred embodiments.

The diamine additive is present in the battery in an amount selected from about 0.001 wt % to about 10 wt %, such as about 0.01 wt % to about 1 wt %, in some embodiments.

The anode can comprise a material selected carbon, lithium metal, lithiated oxide, or combinations of the foregoing. The cathode can comprise a lithium transition-metal oxide, for example.

In preferred embodiments, the electrolyte provides (or comprises) a means for improving battery discharge capacity at temperatures from about 0-45° C., relative to a battery without the diamine additive. For example, in some embodiments, the discharge capacity of the battery is higher than the discharge capacity of a battery without the diamine additive, wherein discharge capacity is measured at about 45° C. or at about 0° C.

In preferred embodiments, the electrolyte provides (or comprises) a means for improving battery cycling stability at temperatures from about 0-45° C., over at least 10 charge/discharge cycles, for example. In some embodiments, the cycling stability of the battery is better than the cycling stability of a battery without the diamine additive, wherein cycling stability is measured at about 45° C. or at about 0° C. over at least 10 charge/discharge cycles.

In a specific embodiment, this invention provides an improved lithium-ion battery comprising an anode and a cathode, each capable of reversibly absorbing and releasing lithium ions; the battery further comprising an electrolyte including a non-aqueous solvent, a lithium salt soluble in the non-aqueous solvent, and ethylene diamine in an amount from about 0.001 wt % to about 10 wt %.

DETAILED DESCRIPTION OF EMBODIMENTS OF THE INVENTION

The systems and methods of the present invention will now be described in detail by reference to various non-limiting embodiments of the invention.

Unless otherwise indicated, all numbers expressing dimensions, temperatures, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

Embodiments of the present invention will now be described in more detail, including reference to the accompanying figures. The figures provide representative illustration of the invention and are not limiting in their content. It will be understood by one of ordinary skill in the art that the scope of the invention extends beyond the specific embodiments depicted, and the invention is not limited to lithium-ion batteries. This invention also incorporates routine experimentation and optimization of the methods, apparatus, and systems described herein.

This invention is premised, at least in part, on the discovery that suitable polyamines can be added to the non-aqueous electrolyte of a battery, such as a lithium-ion battery, to improve cycling stability across a range of temperatures. Polyamines, such as diamine compounds, can improve the high-rate capabilities and cyclability of lithium-ion batteries at low temperatures as well as at high temperature. Battery performance can be enhanced by minimizing the performance gap between extreme temperatures. In addition, amine groups can scavenge undesirable acidic impurities and dissolved metal ions. These functions contribute to better thermal stability and cycle life for the battery.

In variations of the present invention, the electrolyte additive is an end-functionalized diamine compound $H_2N$—R—$NH_2$. The internal R group is organic—i.e., it contains at least one carbon atom. The R group can vary widely and can be aliphatic (saturated or unsaturated), aromatic, or a mixture of the foregoing. Selection of R should be made so as to maintain solubility of the additive $H_2N$—R—$NH_2$ within the overall electrolyte composition.

In some embodiments, R is an aliphatic, linear chain of one or more $CH_2$ species. For example, R can be —$(CH_2)_n$— wherein n is selected from 1-20, preferably from 2-12, and more preferably from 2-6. When n=2, as in certain preferred embodiments, the additive is $H_2N$—$(CH_2)_2$—$NH_2$ (ethylene diamine, EDA). Chain lengths even longer than n=20 are not precluded from the invention, provided an appropriate solvent is employed.

Electrolyte additives can include mixtures of such —$(CH_2)_n$— species having a distribution of values of n, rather than a single value. In these embodiments, for example, the average value of n can be selected from about 1-20, preferably from about 2-12. Again, it is preferable for the mixture of additives to be substantially soluble in the electrolyte during operation across a practical range of temperatures.

It is preferable to select an electrolyte solvent and electrolyte additive such that the additive is substantially soluble in the electrolyte during operation across a practical range of temperatures. If the R group is too large, precipitation of the additive at electrode surfaces could occur, thereby causing formation of a resistive layer and reduction in performance of the battery.

In some embodiments employing electrolyte additives of the form $H_2N$—R—$NH_2$, the R group can include branched hydrocarbon side groups, such as methyl, ethyl, propyl, butyl, isobutyl, and the like, at one or more carbon atoms within the R group.

The R group can include one or more carbon-carbon double bonds (C=C) within its structure or in a side group. In these embodiments, the R group contains at least two carbon atoms. For example, the electrolyte additive can be $H_2N$—C(H)=C(H)—$NH_2$.

In some embodiments, the R group can include non-aromatic cyclic structures either within the primary chain or within a side group. For example, when the R group is cyclohexane, the resulting molecule is 1,4-diaminocyclohexane. It is noted that 1,2-diaminocyclohexane and 1,3-diaminocyclohexane are also of the form $H_2N$—R—$NH_2$ within the context of the present invention.

In some embodiments, the R group can include aromatic cyclic structures (e.g., phenyl groups) either within the primary chain or within a side group.

It will also be recognized that there can be one or more substitutions at internal carbon atoms within the R group of $H_2N$—R—$NH_2$. Such substitutions can be intentional or unintentional. For example, the linear carbon chain $(CH_2)_5$ can be modified to replace one or more of the ten hydrogen atoms with any other chemical element or molecule with a +1 oxidation state.

In certain embodiments, at least one additional amine group (—$NH_2$) is inserted into the primary R group in place of a hydrogen atom. Additional amine groups can introduce added basicity to the electrolyte additive. The $H_2N$—R—$NH_2$ additive therefore can include a total of 2, 3, 4, 5 or more amine groups, if desired. If the R group is linear, then the additional amine groups will not be end-functionalized. If the R group is cyclic or includes a cyclic component, then one or more of the additional amine groups can also be end-functionalized. For example, the additive 1,3-diaminocyclohexane could be modified to replace a hydrogen at the 5-carbon with an amine group, thereby generating one or more stereoisomers of 1,3,5-triaminocyclohexane.

Diamine compounds are preferred as electrolyte additives because the diamine molecules are generally soluble in non-aqueous electrolytes, especially at low concentrations. The preferred amount of $H_2N$—R—$NH_2$ added to the electrolyte can vary. The maximum amount that can be beneficially added will depend on the equilibrium solubility of the specific $H_2N$—R—$NH_2$ molecule and the specific electrolyte solvent. Typically, less than this maximum amount of additive is added. One should avoid using an amount of additive that would tend to cause precipitation at electrode surfaces, which could lead to additional resistance and reduce performance of the battery.

The amount of electrolyte additive may vary over a wide range from about 0.001 wt % to about 10 wt % or more, based on the weight of all the electrolyte components. In some embodiments, the amount of electrolyte additive is from about 0.01-1 wt %, such as about 0.05 wt %, 0.1 wt %, or 0.5 wt %, which amounts are exemplary and non-limiting concentrations of the electrolyte additive. Very high quantities of electrolyte additive (e.g., higher than 10 wt %) can reduce the capacity and hinder the kinetics of a battery cell.

In preferred embodiments, the presence of the electrolyte additive $H_2N$—R—$NH_2$ as described herein improves the discharge-rate capabilities (high power output) and cyclability (i.e., stability over many charge/discharge cycles) of lithium-ion batteries. Such improvements can be realized at low temperatures (e.g., down to −30° C. or less), as well as at high temperatures (e.g., up to 60° C. or more). Significantly, preferred electrolyte additives are effective to both enhance cycling kinetics (for lithium ions) at low temperatures as well as minimize capacity fading at high temperatures.

Electrolyte additives in accordance with this invention can help maintain good battery capacity and cycle stability throughout a range of practical operation temperatures and occasional temperature excursions outside normal ranges (such as between −30° C. to 60° C.). In some variations, electrolyte additives are selected or designed to be effective at any practical temperature, by exploiting different chemical mechanisms suitable to confer benefits at both low and high temperatures.

It is believed that at low temperatures, diamine electrolyte additives can better maintain charge-transfer resistance which would otherwise increase more rapidly as temperature drops. Diamines are strong bases and are expected to form bonds with Li ions. Without being limited to any particular hypothesis, suitable diamines may catalytically assist the charge transfer and intercalation chemistry involving Li ions at electrode surfaces, thereby enhancing cycling kinetics.

It is believed that at high temperatures, diamine electrolyte additives can neutralize acidic impurities such as hydrogen fluoride, HF. Diamine electrolyte additives can also chelate dissolved metal ions which can be more prevalent at higher temperatures. Without being limited to any particular hypothesis, suitable diamines can serve as effective scavengers to enhance thermal stability and cycle life of lithium-ion batteries, thereby minimizing capacity fading.

In some embodiments, selection of the R group is made specifically to account for the binding tendency of the $H_2N$—R—$NH_2$ molecule with Li ions. In some embodiments, selection of the R group is made specifically to maintain adequate scavenging potential of the $H_2N$—R—$NH_2$ molecule with acid and/or metal impurities. In certain embodiments, selection of the R group accounts for both of these functionalities, so that the resulting $H_2N$—R—$NH_2$ additive offers benefits at both low and high temperatures, as is preferred.

Figure 1:
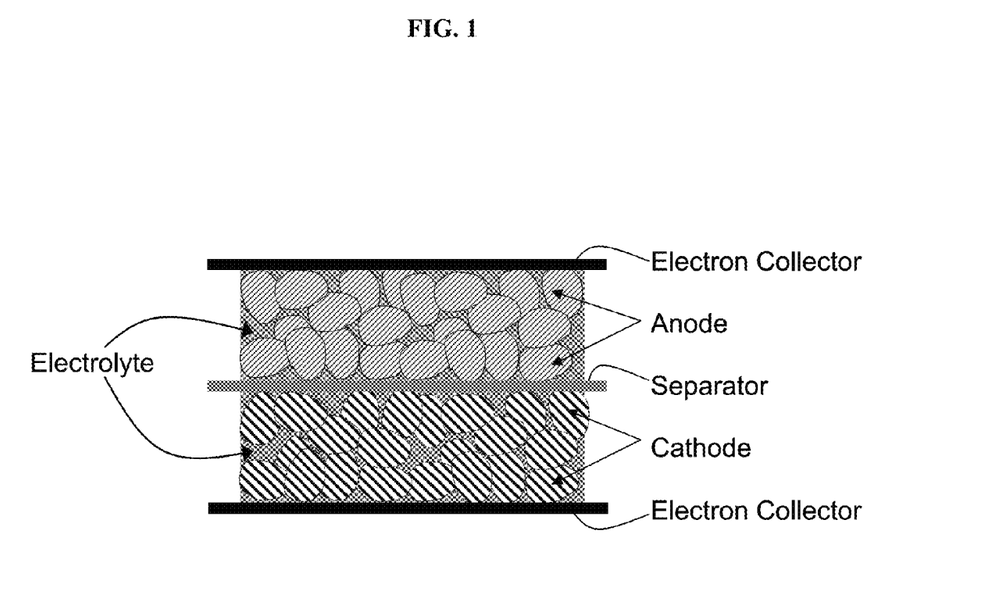
FIG. 1 shows a lithium-ion battery, in which a liquid electrolyte is filled in the pores of both cathode and anode layers to provide conductive paths to Li ions between cathode and anode, wherein the electrolyte composition includes at least one additive in accordance with the present invention.

FIG. 1 shows an exemplary structure of a rechargeable lithium-ion battery. The primary functional components of a lithium-ion battery are the anode, cathode, and electrolyte, in which a lithium ion moves between the anode and cathode in the electrolyte comprising a $H_2N$—R—$NH_2$ additive as described above. A separator is used to separate cathode and anode to prevent electron shortage. Electron collectors, normally metal, are used to collect electrons from both cathode and anode. The lithium ion moves from the anode to the cathode during discharge and from the cathode to the anode when charging.

Both the anode and cathode are materials into which and from which lithium can migrate. The process of lithium moving into the anode or cathode is referred to as insertion (or intercalation), and the reverse process, in which lithium moves out of the anode or cathode is referred to as extraction (or deintercalation).

Any cathode capable of absorbing and releasing lithium ions can be employed. The cathode material can be selected from lithium metal oxides, such as (but not limited to) $LiCoO_2$, $LiMn_2O_4$, $LiFePO_4$, $Li_2FePO_4$, $LiNiO_2$, and phosphates. As used herein, "absorbing" is meant to include any chemical or physical mechanism of the insertion of Li ions into a cathode material, such as (but not limited to) absorption, adsorption, intercalation, and chemical reaction.

The cathode may further comprise one or more conductive fillers to provide enhanced electronic conductivity. Examples of conductive fillers include, but are not limited to, conductive carbons, graphites, activated carbon fibers, non-activated carbon nanofibers, metal flakes, metal powders, metal fibers, carbon fabrics, metal mesh, and electrically conductive polymers. The cathode may also further comprise other additives such as, for example, aluminas, silicas, and transition metal chalcogenides.

The cathode may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, polytetrafluoroethylenes, polyvinylidene fluorides, ethylene-propylene-diene rubbers, polyethylene oxides, acrylates, methacrylates, divinyl ethers, and the like.

The cathode may further comprise a current collector as known in the art. Current collectors are useful in efficiently collecting the electrical current generated throughout the cathode and in providing an efficient surface for attachment of the electrical contacts leading to the external circuit as well as functioning as a support for the cathode. Examples of useful current collectors include, but are not limited to, metallized plastic films, metal foils, metal grids, expanded metal grids, metal mesh, metal wool, woven carbon fabric, woven carbon mesh, non-woven carbon mesh, and carbon felt.

Any anode capable of reversibly absorbing and releasing lithium ions can be employed. Exemplary anode materials include, but are not limited to, conductive carbon (intercalating Li ions typically as $LiC_6$), titanium oxides, silicon, germanium, copper/tin, and lithium compounds containing metal oxides, such as oxides of W, Fe, and Co. Anodes can also include fillers, binders, and current collectors. "Absorbing" is again meant to include any chemical or physical mechanism effective for the insertion of Li ions into an anode material, such as (but not limited to) absorption, adsorption, intercalation, and chemical reaction.

The conductive carbon compound that can be used in the anode is any electron-conducting carbon. Specific examples include natural graphites, such as flaky graphite, plate-like graphite, and other types of graphite; high-temperature sintered carbon products obtained, for example, from petroleum coke, coal coke, celluloses, saccharides, and mesophase pitch; artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes.

The liquid electrolyte conducts Li ions, acting as a carrier between the cathode and the anode when a battery passes an electric current through an external circuit. In addition to the $H_2N—R—NH_2$ additive, the electrolyte generally includes a solvent and a lithium salt (made up of an anion and a lithium cation). Examples of the solvent that can be used include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. Ethylene carbonate and propylene carbonate are preferable. As is known in the art, other minor components and impurities can be present in the electrolyte composition.

Lithium salts include, but are not limited to, $LiClO_4$, $LiBF_4$, $LiPF_6$, $LiCF_3SO_3$, $LiCF_3CO_2$, $LiAsF_6$, $LiSbF_6$, $LiAlCl_4$, LiCl, LiBr, and LiI, which may be used alone or as a mixture of two or more. $LiBF_4$ and $LiPF_6$ are preferable, in some embodiments. The concentration of the salt is not particularly limited, but preferably is about 0.1 to 5 mol/L of the electrolytic solution.

The amount of electrolytes to be used in the battery can vary. Preferred amounts will depend on the amounts of the cathode and anode active material and the size of the battery.

The separator can be an insulating thin film that is high in ion permeability and that has a prescribed mechanical strength. As the material of the separator, an olefin polymer, a fluorine-containing polymer, a cellulose polymer, a polyimide, a nylon, glass fiber, or alumina fiber, in the form of a non-woven fabric, a woven fabric, or a microporous film, can be used.

Li-ion batteries employing electrolyte additives according to this invention can be suitable for operating across a variety of temperature ranges. The temperature of Li-ion battery operation can vary, as is known. Exemplary operation temperatures can be from about −50° C. to about 80° C., such as for military applications. For computers and related devices, as well as for electric-vehicle applications, an exemplary operation range is about −30° C. to about 60° C. Ambient (environmental) and battery (operating) temperature are not necessarily the same. Computers designed for use in cold or hot temperatures may provide heaters or coolers to maintain proper battery and device operating temperature ranges, for example.

According to preferred embodiments of the invention, the discharge capacity C (measured in amp-hour, or Ah) of a Li-ion battery incorporating an electrolyte additive is higher than the discharge capacity of a battery without such additive. Discharge capacity can be evaluated at various currents or, more commonly, at various C rates. The C rate is conventionally used to describe battery loads or battery charging in terms of time to charge or discharge C amp-hour. The C rate has the units of amp (or ampere), A, and is capacity C divided by time in hours. A C rate of 1 C, means 1 hour to discharge C amp-hour. Other C rates can be employed to evaluate discharge capacity, such as C/2 (2 hours of discharge), C/6 (6 hours of discharge), and so on.

The discharge capacity can be measured at one or more temperatures, which should be temperatures within the practical range of battery operation for the intended application. For example, discharge capacity can be measured at one or more of −30° C., −15° C., 0° C., 15° C., 30° C., 45° C., and/or 60° C. (as well as at any intermediate temperature). Preferably, discharge capacity is improved in the presence of the electrolyte additive at multiple temperatures, up to and including all temperatures within a prescribed range.

According to preferred embodiments of the invention, the cycling stability of a Li-ion battery incorporating an electrolyte additive is better than the cycling stability of a battery without such additive. The cycling stability of a battery can be characterized by the number of charging or discharging cycles until its capacity is reduced to a certain amount of its nominal capacity (such as 50% to 80%). Or, a certain number of cycles can be conducted, after which cycling stability is measured by the discharge capacity of the battery. If the discharge capacity is maintained, the battery is regarded as having cycling stability for the number of cycles tested.

The cycling stability can be measured at one or more temperatures, which should be temperatures within the practical range of battery operation for the intended application, similar to the measurements for discharge capacity. Also, a reasonable number of cycles should be tested to evaluate cycle stability. This number can vary, as will be appreciated; exemplary numbers of cycles include (but are not limited to) 10, 25, 50, 100, 200, 500 or more charge/discharge cycles.

A Li-ion-battery can optionally include other additives in addition to the electrolyte additives provided herein. For example, some embodiments incorporate fire retardants, such as those described in co-pending patent application Ser. No. 12/395,638, entitled "Encapsulated Fire-Retardant Materials to Improve Battery Safety," filed Mar. 7, 2009, which is hereby incorporated by reference herein in its entirety.

Certain embodiments of the present invention will now be further described with reference to the accompanying examples, which by no means should be construed to limit the invention.

Example 1

1 mM of ethylene diamine, $H_2N(CH_2)_2NH_2$, is added to an electrolyte consisting of 1 M $LiPF_6$ in 1:1 volume ratio of ethylene carbonate (EC):dimethyl carbonate (DMC). A Swagelok-type cell is prepared by sandwiching a $LiFePO_4$ cathode, a separator and carbon anode between two spring-loaded stainless-steel pistons.

Figure 2:
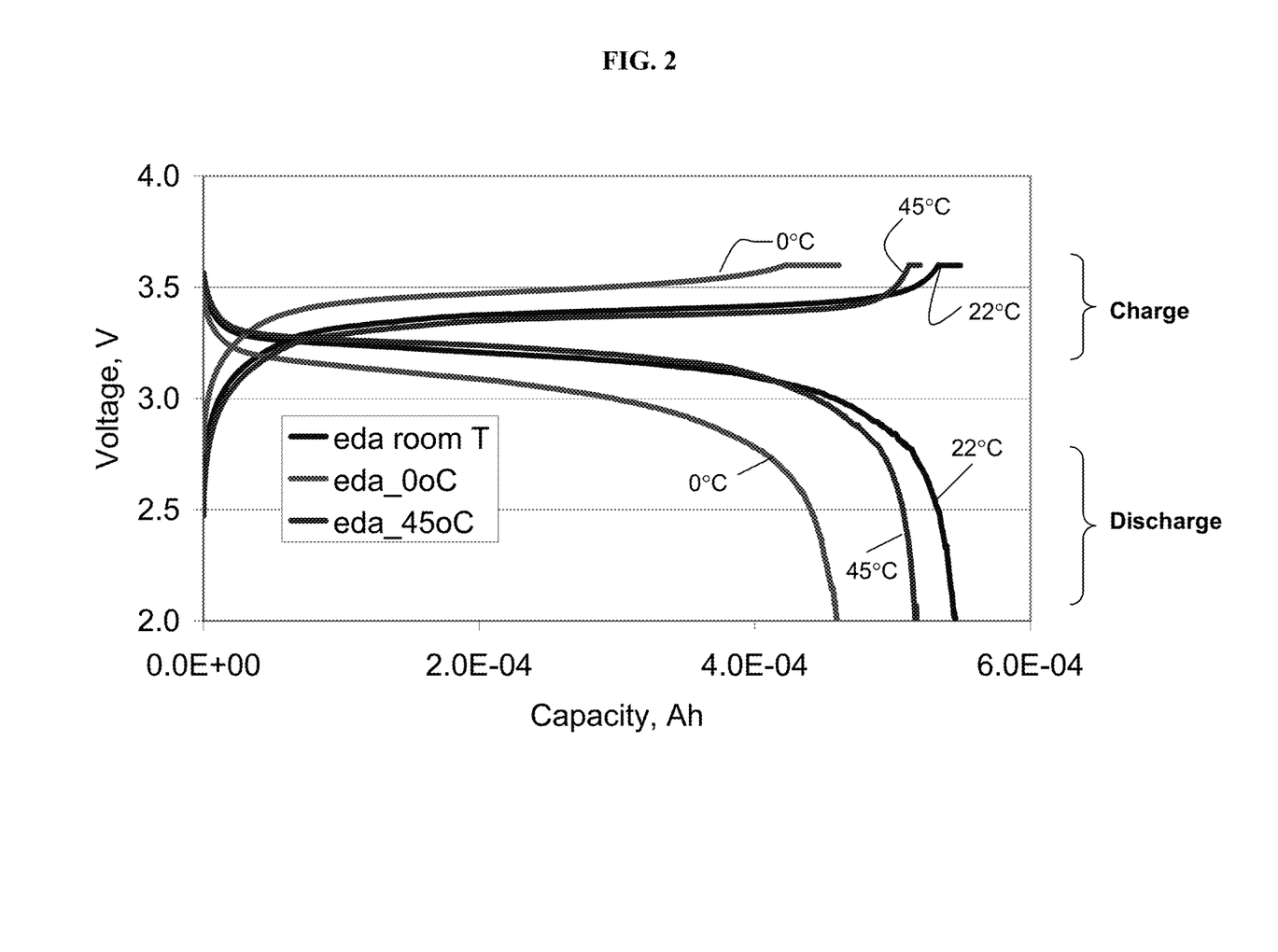
FIG. 2 shows the cycling performance of a battery cell using ethylene diamine electrolyte additive at different temperatures and at a C rate of 1 C amp, in Example 1.

Charge/discharge cycling is then performed on an Arbin battery tester (Arbin Corp., College Station, Tex., U.S.) at a constant current between potentials of about 2.0 V and 3.6 V. The battery cell is first subjected to 5 cycles at room temperature (22° C.), then 3 cycles at 0° C., followed by 3 cycles at 45° C. FIG. 2 shows the cycling performance of the battery cell using ethylene diamine electrolyte additive at different temperatures, at 1 C rate. The x-axis in FIG. 2 shows that battery capacities drop only slightly with cycling, at any of the temperatures.

Figure 3:
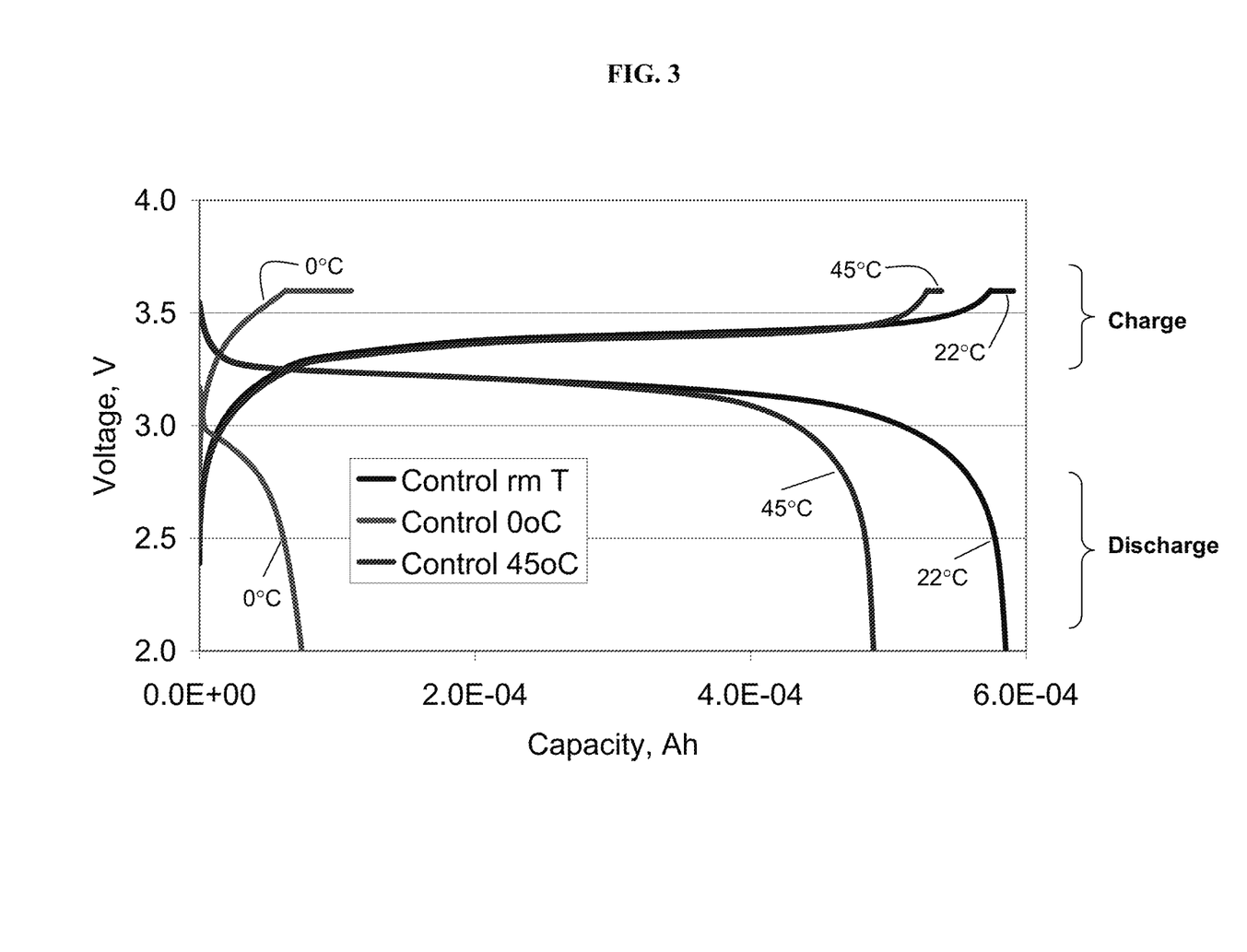
FIG. 3 shows the cycling performance of a battery cell without an electrolyte additive, at different temperatures and at a C rate of 1 C amp.

For comparison, a Swagelok cell assembled without the ethylene diamine additive is also tested in an Arbin battery tester under the same conditions, as a control experiment. FIG. 3 shows reduced cycling performance of the battery cell without the electrolyte additive, at different temperatures and at a C rate of 1 C.

Example 2

1 mM of ethylene diamine, $H_2N(CH_2)_2NH_2$, is added to an electrolyte consisting of 1 M $LiPF_6$ in 1:1 volume ratio of ethylene carbonate (EC):dimethyl carbonate (DMC). A Swagelok-type cell is prepared by sandwiching a LiFePO$_4$ cathode, a separator and lithium anode, similar to Example 1. Charge/discharge cycling is performed on an Arbin battery tester.

Figure 4:
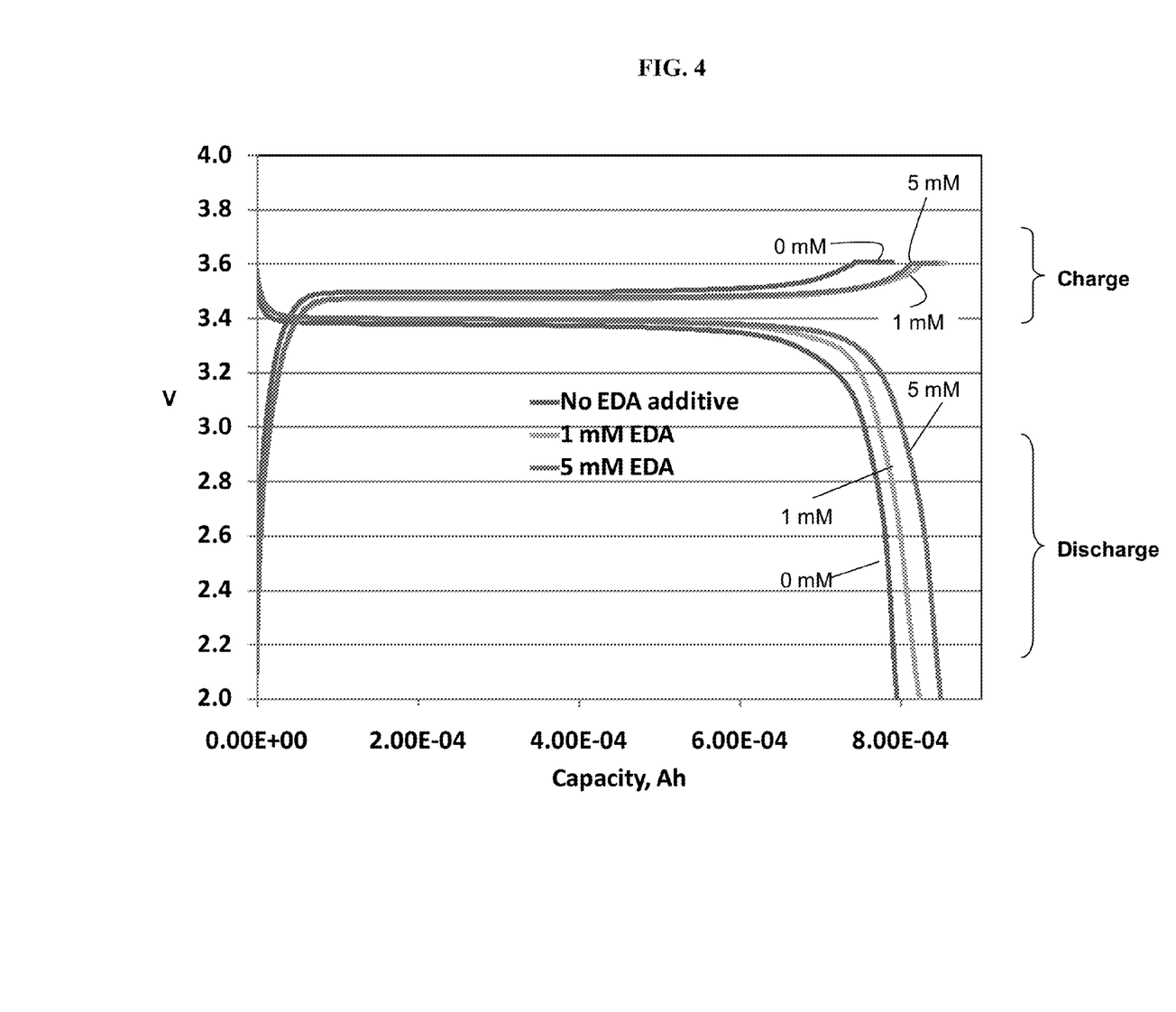
FIG. 4 depicts charge/discharge behavior of $LiFePO_4$ cathode material with different concentrations of ethylene diamine additive at 45° C., in Example 2.

In FIG. 4, the charge/discharge behavior of LiFePO$_4$ cathode material with different concentrations of ethylene diamine additive are compared with the charge/discharge behavior without such additive, at 45° C. The voltage on the y-axis of FIG. 4 is relative to a lithium reference electrode. The curves shown are for 0 mM, 1 mM and 5 mM of ethylene diamine additive in the electrolyte.

Figure 5:
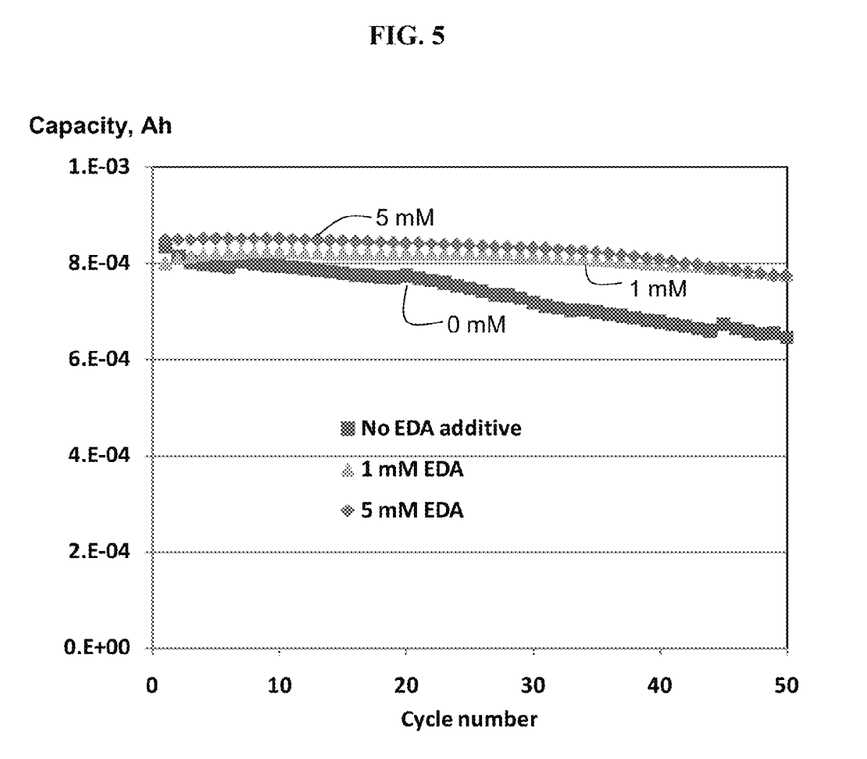
FIG. 5 compares cycling performance of $LiFePO_4$ cathode material with different concentrations of ethylene diamine additive at 45° C., in Example 2.

FIG. 5 compares cycling performance of LiFePO$_4$ cathode material with different concentrations of ethylene diamine additive. This figure shows discharge capacity as a function of cycle number for the LiFePO$_4$ cathode at 45° C. The voltage on the y-axis of FIG. 5 is relative to a lithium reference electrode. The data shown are for 0 mM, 1 mM and 5 mM of ethylene diamine additive in the electrolyte. FIG. 5 indicates that when some ethylene diamine is present, the capacity falls much less over repeated cycling. Stability is improved with the introduction of ethylene diamine additive to the electrolyte.

The results of this Example 2 demonstrate that the electrolyte comprising ethylene diamine additive can enhance the cycling stability of a Li-ion battery using these materials.

Practical applications for this invention include, but are not limited to, laptop computers, mobile phones, cameras, electric vehicles, and aerospace components. Electric vehicles, in particular, can benefit from batteries that offer improved performance across a wide temperature range. Notably, variations of this invention can be employed without substantially altering existing manufacturing procedures.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, equations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A lithium-ion battery electrolyte composition consisting essentially of a non-aqueous solvent, a lithium salt soluble in said non-aqueous solvent, and one or more diamine additives having the formula H$_2$N—R—NH$_2$, wherein R is a saturated aliphatic chain organic group, having from 1 to 20 carbon atoms, wherein said diamine additive is soluble in said electrolyte composition, and wherein said diamine additive is present in an amount from 1 wt % to 10 wt %.

2. The electrolyte composition of claim 1, wherein R is —(CH$_2$)$_n$— and wherein n is selected from 1 to 20.

3. The electrolyte composition of claim 2, wherein n is selected from 2 to 12.

4. The electrolyte composition of claim 3, wherein n is selected from 2 to 6.

5. The electrolyte composition of claim 4, wherein said diamine additive is ethylene diamine.

6. The electrolyte composition of claim 1, wherein R is linear.

7. A lithium-ion battery comprising:
   (a) an anode capable of reversibly absorbing and releasing lithium ions;
   (b) a cathode capable of reversibly absorbing and releasing lithium ions; and
   (c) an electrolyte consisting essentially of a non-aqueous solvent, a lithium salt soluble in said non-aqueous solvent, and at least one diamine additive having the formula H$_2$N—R—NH$_2$, wherein R is a saturated aliphatic chain organic group, having from 1 to 20 carbon atoms, wherein said diamine additive is soluble in said electrolyte, and wherein said diamine additive is present in an amount from 1 wt % to 10 wt %,
   wherein the presence of said diamine additive that is soluble in said electrolyte increases the battery cycling stability of said lithium-ion battery, and
   wherein the surfaces of said anode and said cathode are free of precipitated diamine additive.

8. The battery of claim 7, wherein R is —(CH$_2$)$_n$— and wherein n is selected from 1 to 20.

9. The battery of claim 8, wherein n is selected from 2 to 12.

10. The battery of claim 9, wherein said diamine additive is ethylene diamine.

11. The battery of claim 7, wherein said anode comprises a material selected from the group consisting of carbon, lithium metal, lithiated oxide, and combinations of the foregoing.

12. The battery of claim 7, wherein said cathode comprises a lithium transition-metal oxide.

13. The battery of claim 7, wherein the presence of said diamine additive increases the battery discharge capacity of said lithium-ion battery.

14. The battery of claim 7, wherein said battery cycling stability is measured at about 45° C. over at least 10 charge/discharge cycles.

15. The battery of claim 7, wherein said battery cycling stability is measured at about 0° C. over at least 10 charge/discharge cycles.

16. A lithium-ion battery comprising an anode and a cathode, each capable of reversibly absorbing and releasing lithium ions; said battery further comprising an electrolyte consisting essentially of a non-aqueous solvent, a lithium salt soluble in said non-aqueous solvent, and ethylene diamine in an amount from 1 wt % to 10 wt % based on said electrolyte, wherein said ethylene diamine is soluble in said electrolyte, and wherein the surfaces of said anode and said cathode are free of precipitated ethylene diamine.

* * * * *